(12) United States Patent
Yokouchi et al.

(10) Patent No.: US 9,478,366 B2
(45) Date of Patent: Oct. 25, 2016

(54) ELECTRIC STORAGE DEVICE AND METHOD FOR PRODUCING THE SAME

(71) Applicant: SHOWA DENKO K.K., Tokyo (JP)

(72) Inventors: Hitoshi Yokouchi, Tokyo (JP);
Masahiro Ohmori, Tokyo (JP);
Masatoshi Kunisawa, Tokyo (JP)

(73) Assignee: SHOWA DENKA K.K., Tokyo (JP)

( * ) Notice: Subject to any disclaimer, the term of this patent is extended or adjusted under 35 U.S.C. 154(b) by 0 days.

(21) Appl. No.: 14/424,605

(22) PCT Filed: Aug. 29, 2013

(86) PCT No.: PCT/JP2013/005096
§ 371 (c)(1),
(2) Date: Feb. 27, 2015

(87) PCT Pub. No.: WO2014/034113
PCT Pub. Date: Mar. 6, 2014

(65) Prior Publication Data
US 2015/0213967 A1 Jul. 30, 2015

(30) Foreign Application Priority Data
Aug. 29, 2012 (JP) .................................. 2012-188605

(51) Int. Cl.
*H01M 10/052* (2010.01)
*H01G 11/36* (2013.01)
(Continued)

(52) U.S. Cl.
CPC .............. *H01G 11/36* (2013.01); *H01G 11/26* (2013.01); *H01G 11/28* (2013.01); *H01G 11/38* (2013.01);
(Continued)

(58) Field of Classification Search
CPC ... H01M 4/0404; H01M 4/667; H01M 4/663
See application file for complete search history.

(56) References Cited

U.S. PATENT DOCUMENTS 5,589,297 A   12/1996   Koga et al.
6,001,139 A * 12/1999   Asanuma ................ H01M 4/13
                                                            29/623.3
(Continued)

FOREIGN PATENT DOCUMENTS

JP     2001-351612 A     12/2001
JP     2003-157852 A     5/2003
(Continued)

OTHER PUBLICATIONS

International Search Report of PCT/JP2013/005096, dated Nov. 12, 2013. [PCT/ISA/210].
(Continued)

*Primary Examiner* — Stewart Fraser
*Assistant Examiner* — Olatunji Godo
(74) *Attorney, Agent, or Firm* — Sughrue Mion, PLLC

(57) ABSTRACT

An electricity storage device including at least one electrode having one metal tab lead and plural electrode plates. The electrode plate includes a metal foil, an undercoat layer formed on one surface or both surfaces of the metal foil, and an active material layer formed on a surface of the undercoat layer. The undercoat layer includes a carbon material and the undercoat layer has a coating weight per unit area of one surface of 0.01 to 3 g/m$^2$. A sum total thickness of the metal foils in the electrode plates is 0.2 to 2 mm. The electrode plates are welded to each other in a portion where the undercoat layer is formed and no active material layer is formed. Further, at least one of the electrode plates is welded to the metal tab lead in a portion where the undercoat layer is formed and no active material layer is formed.

14 Claims, 4 Drawing Sheets

(51) Int. Cl.

| | |
|---|---|
| *H01G 11/66* | (2013.01) |
| *H01M 4/36* | (2006.01) |
| *H01M 4/66* | (2006.01) |
| *H01G 11/28* | (2013.01) |
| *H01G 11/38* | (2013.01) |
| *H01G 11/72* | (2013.01) |
| *H01G 11/26* | (2013.01) |
| *H01G 11/86* | (2013.01) |
| *H01M 4/133* | (2010.01) |
| *H01M 4/587* | (2010.01) |
| *H01M 10/0525* | (2010.01) |
| *H01M 2/26* | (2006.01) |
| *H01G 11/76* | (2013.01) |
| *H01M 10/058* | (2010.01) |
| *H01G 11/04* | (2013.01) |

(52) U.S. Cl.
CPC .............. *H01G 11/66* (2013.01); *H01G 11/72* (2013.01); *H01G 11/86* (2013.01); *H01M 4/133* (2013.01); *H01M 4/366* (2013.01); *H01M 4/587* (2013.01); *H01M 4/661* (2013.01); *H01M 4/663* (2013.01); *H01M 4/667* (2013.01); *H01M 10/052* (2013.01); *H01M 10/0525* (2013.01); *H01G 11/04* (2013.01); *H01G 11/76* (2013.01); *H01M 2/266* (2013.01); *H01M 10/058* (2013.01); *Y02E 60/122* (2013.01); *Y02E 60/13* (2013.01); *Y02P 70/54* (2015.11); *Y02T 10/7022* (2013.01); *Y10T 29/417* (2015.01); *Y10T 29/49108* (2015.01)

(56) References Cited

U.S. PATENT DOCUMENTS

| | | | | |
|---|---|---|---|---|
| 2002/0106553 | A1* | 8/2002 | Nemoto | H01M 2/361 429/52 |
| 2005/0042450 | A1* | 2/2005 | Sano | B82Y 30/00 428/375 |
| 2009/0029255 | A1 | 1/2009 | Ohmori | |
| 2009/0135547 | A1* | 5/2009 | Nanba | H01G 11/24 361/502 |
| 2011/0027649 | A1 | 2/2011 | Abe | |
| 2011/0274971 | A1* | 11/2011 | Sakamoto | H01M 4/13 429/217 |
| 2013/0196230 | A1 | 8/2013 | Yokouchi et al. | |
| 2013/0295458 | A1 | 11/2013 | Yokouchi et al. | |

FOREIGN PATENT DOCUMENTS

| | | |
|---|---|---|
| JP | 2006-4739 A | 1/2006 |
| JP | 2007-226969 A | 9/2007 |
| JP | 2009-76301 A | 4/2009 |
| JP | 2009-252396 A | 10/2009 |
| JP | 2010-170965 A | 8/2010 |
| JP | 2012-74369 A | 4/2012 |
| JP | 2013-110098 A | 6/2013 |
| WO | 2012/096189 A1 | 7/2012 |

OTHER PUBLICATIONS

Supplemental European Search Report dated Jun. 14, 2016 issued by the European Patent Office in corresponding application No. 13831991.

* cited by examiner

ELECTRIC STORAGE DEVICE AND METHOD FOR PRODUCING THE SAME

CROSS REFERENCE TO RELATED APPLICATIONS

This application is a National Stage of International Application No. PCT/JP2013/005096 filed Aug. 29, 2013, claiming priority based on Japanese Patent Application No. 2012-188605, filed Aug. 29, 2012, the contents of all of which are incorporated herein by reference in their entirety.

TECHNICAL FIELD

The present invention relates to an electricity storage device and a method for producing the electricity storage device. More specifically, the present invention relates to an electricity storage device comprising an electrode configured by welding one metal tab lead and at least two electrode plates, and a method for producing the electricity storage device.

BACKGROUND ART

As an electricity storage device, there are known a secondary battery such as a nickel hydrogen battery, a nickel-cadmium battery, a lead storage battery, a lithium-ion secondary battery and the like and a capacitor such as an electric double layer capacitor, a lithium-ion capacitor, and the like. Of these, the lithium-ion secondary battery is used for an electric vehicle, a hybrid car, and the like. Further, the electric double layer capacitor is used as a back-up power supply in instantaneous power failure and the like.

The lithium-ion secondary battery comprises at least a positive electrode plate and a negative electrode plate. The positive electrode plate is configured by forming a positive electrode active material layer on a current collector such as an aluminum foil and the like. In the positive electrode active material layer, a transition metal oxide containing lithium, or the like is used as a positive electrode active material. The negative electrode plate is configured by forming a negative electrode active material layer on a negative electrode current collector such as a copper foil and the like. In the negative electrode active material layer, a carbon material such as graphite is used as a negative electrode active material. As a terminal for taking out current from the positive electrode plate or the negative electrode plate, a metal tab lead is used, in which the metal tab lead is welded to each of the positive electrode plate and the negative electrode plate. The welding of the metal tab lead is carried out in a portion where the current collector is exposed.

The electric double layer capacitor comprises at least a pair of electrode plates. The electrode plate is configured by forming an active material layer on a current collector such as an aluminum foil and the like. In the active material layer, a carbon material such as activated carbon and the like having large specific surface area is used as an active material. As terminal for taking out current from the electrode plates, a metal tab lead is employed in which the metal tab lead is welded to each of the electrode plates. The welding of the metal tab lead is carried out in a portion where the current collector is exposed.

In the electricity storage device, high capacity and high speed charging and discharging are being demanded to respond to applications such as an electric vehicle, electrically-powered equipment, and the like. As one measure for responding to this demand, it has been proposed that an undercoat layer is disposed between an active material layer and a current collector to reduce a resistance of a contact interface between the active material layer and the current collector (for example, Patent Documents 1 to 4). Also in an electrode plate provided with an undercoat layer, a metal tab lead is welded in a portion where a current collector is exposed, i.e., in a portion where neither the undercoat layer nor an active material layer is formed (for example, Patent Document 1).

PRIOR ART LITERATURES

Patent Documents

Patent Document 1: JP 2010-170965 A (US 2011/274971 A1)
Patent Document 2: JP 2001-351612 A
Patent Document 3: JP 2008-098590 A
Patent Document 4: JP 2012-073396 A (US 2012/078629 A1)

SUMMARY OF THE INVENTION

Problems to be Solved by the Invention

As a method for forming an exposed portion of a current collector, there is known a method for forming neither an undercoat layer nor an active material layer in a portion to be welded on a current collector. When the portion to be welded is previously provided, the versatility of the current collector is decreased, resulting in inconvenience in production of a wide variety of electrodes. As another method, a method for partially removing an undercoat layer and an active material layer formed on a current collector is known. In this case, a step of removing the undercoat layer and the active material layer is added, resulting in a decrease in productivity.

In order to produce a high-capacity battery, at least two positive electrode plates and at least two negative electrode plates are occasionally stacked respectively. Also, in the electric double layer capacitor, in order to increase capacitance, plural electrode plates are occasionally stacked. When a plurality of electrode plates are used, the above-described problem in forming a current collector-exposed portion becomes serious.

An object of the present invention is to provide a method for producing, with high productivity, an electricity storage device comprising an electrode configured by welding one metal tab lead and at least two electrode plates.

Means for Solving the Problems

Extensive studies by the present inventors for achieving the object result in finding an electricity storage device and a method for producing the electricity storage device including the following aspects.

The present invention includes the following aspects.
(1) An electricity storage device comprising at least one electrode comprising a metal tab lead and at least two electrode plates, wherein
the electrode plate comprises a metal foil, an undercoat layer formed on one surface or both surfaces of the metal foil, and an active material layer formed on a surface in a part of a portion where the undercoat layer is formed;

the undercoat layer comprises a carbon material and the undercoat layer has a coating weight per unit area of one surface of 0.05 to 3 g/m²;

the electrode plates are welded to each other in a portion where the undercoat layer is formed and no active material layer is formed; and at least one of the electrode plates is welded to the metal tab lead in a portion where the undercoat layer is formed and no active material layer is formed.

(2) The electricity storage device according to (1), wherein a sum total thickness of the metal foils in the electrode plates is 0.2 to 2 mm.

(3) The electricity storage device according to (1) or (2), wherein the undercoat layer comprises 1 to 60% by mass of the carbon material.

(4) The electricity storage device according to any one of (1) to (3), wherein the undercoat layer comprises 20 to 300 parts by mass of a binding agent based on 100 parts by mass of the carbon material.

(5) The electricity storage device according to (4), wherein the biding agent is chitosan or a derivative thereof.

(6) The electricity storage device according to any one of (1) to (5), wherein an area of the active material layer is 80 to 99% by area of an area of the portion where the undercoat layer is formed.

(7) The electricity storage device according to any one of (1) to (6), wherein the metal tab lead comprises at least one selected from the group consisting of aluminum, copper, and nickel.

(8) The electricity storage device according to any one of (1) to (7), wherein the metal foil is an aluminum foil or a copper foil.

(9) The electricity storage device according to any one of (1) to (8), wherein the each metal foil has a thickness of 5 to 70 µm.

(10) The electricity storage device according to any one of (1) to (9), wherein the carbon material comprises at least one selected from the group consisting of graphite, conductive carbon black, carbon nanotube, and carbon nanofiber.

(11) The electricity storage device according to any one of (1) to (10) is a lithium-ion battery.

(12) A method for producing the electricity storage device according to any one of (1) to (11), the method comprising the steps of:

preparing the electrode plates, in which the electrode plate comprises the metal foil, the undercoat layer formed on one surface or both surfaces of the metal foil, and the active material layer formed on the surface in a part of the portion where the undercoat layer is formed; and welding the electrode plates to each other in the portion where the undercoat layer is formed and no active material layer is formed and welding at least one of the electrode plates to the metal tab lead in the portion where the undercoat layer is formed and no active material layer is formed.

(13) The production method according to (12), wherein the welding steps are performed by one shot welding.

(14) The production method according to (12) or (13), wherein the welding steps are performed by ultrasonic welding.

Advantageous Effects of the Invention

The production method according to the present invention makes it possible to obtain, with high productivity, an electricity storage device comprising an electrode configured by welding one metal tab lead and at least two electrode plates using a simple method. The electricity storage device according to the present invention has large capacitance, small internal resistance, and favorable cycle characteristics in rapid charge and discharge.

EMBODIMENTS FOR CARRYING OUT THE INVENTION

[Electricity Storage Device]

Figure 1:
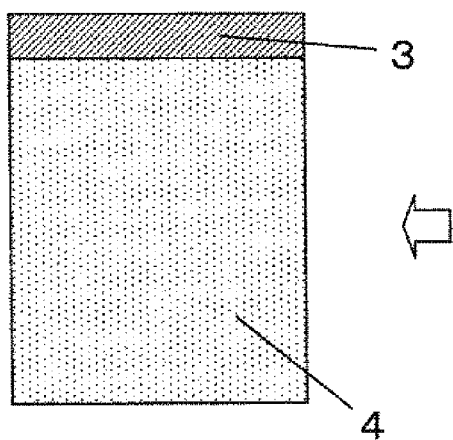
FIG. 1 a view illustrating an embodiment of an electrode plate used in the present invention.
Figure 2:
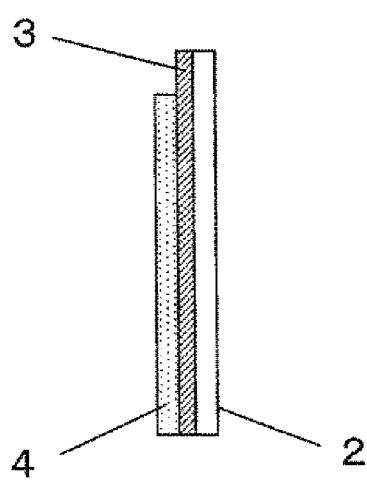
FIG. 2 a view illustrating a side surface when the electrode plate is viewed from the arrow direction illustrated in FIG. 1.

An electricity storage device according to one embodiment of the present invention comprises at least one electrode comprising one metal tab lead and at least two electrode plates. Examples of the electricity storage device comprise a lithium-ion secondary battery, an electric double layer capacitor, and the like. Of these, the electricity storage device according to the present invention is suitable for the lithium-ion secondary battery. In general, plural electrode plates located in one electrode and plural electrode plates located in the other electrode are alternately stacked one by one and housed in an exterior package of an electricity storage device.

<Electrode Plate>

One electrode plate comprises a metal foil, an undercoat layer formed on one surface or both surfaces of the metal foil, and an active material layer formed on a surface in a part of a portion where the undercoat layer is formed.

(Metal Foil)

The metal foil used in the present invention is a well-known one used in a conventional electricity storage device. A material used in the metal foil is not specifically limited, examples of the material include a metal such as nickel, aluminum, titanium, copper, and the like; and an alloy such as stainless steel, nickel alloy, aluminum alloy, titanium alloy, copper alloy, and the like.

In an electrode plate used in the positive electrode of a lithium-ion secondary battery, as the metal foil, an aluminum foil is preferably used, and a pure aluminum foil or an aluminum alloy foil containing not less than 95% by mass of aluminum is more preferably used. Examples of the pure aluminum foil include A1N30 aluminum foil and A1085 aluminum foil, and examples of the aluminum alloy foil include A3003 (Mn-added) aluminum alloy foil.

In an electrode plate used in the negative electrode of the lithium-ion secondary battery, as the metal foil, a copper foil or an aluminum foil is preferably used. When graphite is used as an active material, the metal foil is preferably a copper foil. As the preferable copper foil, a rolled copper foil or an electrolyzed copper foil having a purity of not less than 95% by mass is mentioned. As the preferable aluminum foil, the same ones as those usable for the positive electrode of the lithium-ion secondary battery are mentioned.

In an electrode plate used in the electrode of an electric double layer capacitor, as the metal foil, an aluminum foil is preferably used. As the preferable aluminum foil, the same ones as those usable for the positive electrode of the lithium-ion secondary battery are mentioned.

From the viewpoint of easy handling of the metal foil or the electrode plate, or size reduction of the electricity storage device, the metal foil is preferably 5 μm to 70 μm, and more preferably 5 μm to 50 μm in a thickness per one foil.

An area of the metal foil can be appropriately determined depending on the application of the electricity storage device. For example, in use as an electric vehicle power supply, the metal foil is preferably 5000 $mm^2$ to 1000000 $mm^2$ and more preferably 8000 $mm^2$ to 500000 $mm^2$ in an area per one foil.

The metal foil may be a foil having no holes or a foil having holes such as a two-dimensional mesh foil, a three-dimensionally networked foil, a punching metal foil, and the like. The metal foil may have a surface subjected to a well-known surface treatment. Examples of the surface treatment include roughening treatment, etching, silane coupling treatment, chromate treatment, anodization, wash primer, corona discharge, and glow discharge. When an electrically insulating film is formed on the surface by the surface treatment, a thickness of the electrically insulating film is preferably adjusted so that a function as the current collector of the electrode plate is not decreased.

(Undercoat Layer)

The undercoat layer is formed on one surface or both surfaces of a metal foil and preferably formed in contact with one surface or both surfaces thereof. The undercoat layer may be formed on a partial surface of the metal foil or on the entire surface thereof. Formation may be made not only on a main surface of the metal foil but also on an end face thereof. As an embodiment of forming the undercoat layer on the partial surface of the metal foil, there are an embodiment of forming the undercoat layer only on a predetermined area of the metal foil surface, an embodiment of forming the undercoat layer on the entire metal foil surface in a patterned manner such as a dot pattern, a line-and-space pattern, and the like.

An area of a portion where the undercoat layer is formed is preferably not less than 95% by area of an area of the metal foil. When the undercoat layer is formed in a patterned manner, the area of the portion where the undercoat layer is formed is the sum of an area of the undercoat layer literally formed and an area of the metal foil exposed in the undercoat layer formed in the patterned manner.

A coating weight per unit area of a surface of the undercoat layer is 0.05 to 3 $g/m^2$, preferably 0.1 to 2 $g/m^2$, and more preferably 0.1 to 0.7 $g/m^2$. Such a coating weight per unit area reduces an internal resistance of an electricity storage device. Further, a welding strength between electrode plates and a welding strength between an electrode plate and a metal tab lead are maintained in an appropriate range.

A coating weight per unit area of the undercoat layer is a ratio of a mass of the undercoat layer to an area of the undercoat layer (the area is an area of the undercoat layer only, excluding an area of the metal foil exposed in the undercoat layer formed in a patterned manner when the undercoat layer is formed in the patterned manner). The mass of the undercoat layer can be calculated from a difference ($W_0-W_1$), in which, for example, a test piece having an appropriate size is cut out from an electrode plate and its mass $W_0$ is measured, followed by removing the undercoat layer from the test piece, and then a mass $W_1$ after removal of the undercoat layer is measured.

The coating weight per unit area can be adjusted by a well-known method. When, for example, an undercoat layer is formed by coating, the adjustment can be made by a solid content concentration of a coating liquid for forming the undercoat layer or a clearance of a coating liquid applying slit in a coater. Upon intending to increase the coating weight per unit area, the solid content concentration is increased or the clearance is increased. Upon intending to decrease the coating weight per unit area, the solid content concentration is decreased or the clearance is decreased. Further, coating is repeatable at not less than two times until a desired coating weight per unit area is achieved.

The undercoat layer comprises a carbon material. The carbon material used for the undercoat layer is preferably one capable of providing conductivity to the undercoat layer. Examples of the carbon material include conductive carbon black such as acetylene black, Ketjenblack, furnace black, and the like; graphite such as artificial graphite, natural graphite, and the like; and carbon fiber, vapor-grown carbon fiber, carbon nanotube, carbon nanofiber, and the like. Of these, at least one selected from the group consisting of graphite, conductive carbon black, carbon nanotube, and carbon nanofiber is preferable, and conductive carbon black is more preferable. These carbon materials can be used alone or in combination of two or more.

The carbon material may be completely imbedded in the undercoat layer or immobilized by being exposed partially from the undercoat layer. When the undercoat layer is provided with conductivity, the dispersion state of the carbon material in the undercoat layer is not specifically limited. Further, it is preferable that the carbon material does not drop off from the undercoat layer.

A particle diameter of the carbon material is selectable so that binding properties to another material in the undercoat layer, the aforementioned metal foil, or an active material layer to be described later become favorable.

An amount of the carbon material contained in the undercoat layer is preferably 1 to 60% by mass, and more preferably 20 to 50% by mass. When the carbon material is contained at the amount, the conductivity of the undercoat layer is enhanced and then the electric resistance between the metal foil and the active material layer is reduced.

To prevent drop-off of the carbon material and to enhance the adhesion between the metal foil and the undercoat layer or between the active material layer and the undercoat layer, a binding agent may be contained in the undercoat layer. An amount of the binding agent that may be contained in the undercoat layer is preferably 20 to 300 parts by mass, and more preferably 30 to 150 parts by mass based on 100 parts by mass of the carbon material. Examples of the binding agent include acrylic polymers, vinyl polymers, polyvinylidene fluoride, styrene butadiene rubbers, polysaccharides, polysaccharide derivatives and the like. Of these, from the viewpoint of non-aqueous electrolytic solution resistance of the undercoat layer, polysaccharides and polysaccharide derivatives are preferable.

Specific examples of polysaccharides include chitin, chitosan, cellulose, and derivatives thereof. Of these, chitosan is preferable. Examples of polysaccharide derivatives include hydroxyalkylated polysaccharides, carboxyalkylated polysaccharides, sulfuric esterificated polysaccharides and the like. Hydroxyalkylated polysaccharides are preferable from the viewpoint of large solubility to a solvent and easy formation of the undercoat layer. Examples of a hydroxyalkyl group include a hydroxyethyl group, a hydroxypropyl group, a glyceryl group and the like. Of these, a glyceryl group is preferable. A hydroxyalkylated polysaccharide can be synthesized using a well-known method. These binding agents can be used alone or in combination of two or more. At least two of binding agents used may be those merely mixed or those formed with a cross-linked structure, an interpenetrating polymer structure, or a semi-interpenetrating polymer structure. Of these, those formed with a cross-linked structure, an interpenetrating polymer structure, or a semi-interpenetrating polymer structure are preferable.

The undercoat layer may comprise various types of well-known additives as needed. As the additives, mentioned are dispersion stabilizers, thickeners, sedimentation inhibitors, skinning inhibitors, antifoaming agent, electrostatic coatablity improvers, dripping inhibitors, levelling agents, cross-linking catalysts, cissing inhibitors and the like.

When a polysaccharide or a polysaccharide derivative is incorporated in the undercoat layer as a biding agent, an organic acid is preferably incorporated as an additive. An added amount of the organic acid is preferably 40 to 120 parts by mass, and more preferably 40 to 90 parts by mass based on 100 parts by mass of the polysaccharide or the polysaccharide derivative. As the organic acid, carboxylic acids, sulfonic acids, phosphonic acids, and the like are mentioned. Of these, carboxylic acids are preferable. Examples of the carboxylic acids include 2-phosphonobutane-1,2,4-tricarboxylic acid, 1,2,3,4-butanetetracarboxylic acid, pyromellitic acid and the like. These organic acids can be used alone or in combination of two or more.

As a method for forming an undercoat layer on a metal foil, gas phase method such as a sputtering method, a vapor deposition method, a chemical vapor deposition method, and the like and coating method such as a dipping method, a printing method, and the like are mentioned. Of these, the coating method is preferable from the viewpoint of being able to perform continuous processing using a roll-to-roll system and realize cost reduction.

Formation of the undercoat layer by the coating method comprises preparing a coating liquid comprising components constituting the undercoat layer or precursors thereof, applying the coating liquid on a metal foil, and drying.

Examples of a liquid medium used for the undercoat layer coating liquid include non-protonic polar compounds such as N-methylpyrrolidone, γ-butylolactone, and the like, protonic polar compounds such as ethanol, isopropyl alcohol, n-propyl alcohol, and the like, and water. A solid content concentration of the coating liquid is appropriately set so as for the undercoat layer to have a desired coating weight per unit area.

A method for applying an undercoat layer coating liquid on a metal foil is not specifically limited and a well-known coating method is employable as it is. Specifically, as the method for coating, a casting method, a bar coating method, a dipping method, a printing method, and the like are mentioned. Of these, from the viewpoint of easily controlling a thickness of a coated film, preferable are bar coating, gravure coating, gravure reverse coating, roll coating, Meyer bar coating, blade coating, knife coating, air knife coating, Comma coating, slot diamond coat, slide die coating, and dip coating. Upon coating on both surfaces of the metal foil, a coating operation may be performed for one surface each or for both surfaces at the same time.

A method for drying the coated coating liquid is not specifically limited. Drying temperature is preferably 100 to 300° C., and more preferably 120 to 250° C. Drying time is preferably 10 seconds to 10 minutes. Drying under such conditions makes it possible to completely eliminate a liquid medium in the undercoat layer without decomposition of components in the undercoat layer, resulting in formation of an undercoat layer having a favorable surface shape with high throughput.

(Active Material Layer)

An active material layer is formed on a partial surface of a portion where an undercoat layer is formed and preferably formed in contact with a partial surface of the portion where the undercoat layer is formed. "A portion where an undercoat layer is formed" comprises not only a portion of an undercoat layer literally formed on the metal foil surface but also a portion of the metal foil exposed in the undercoat layer formed in a patterned manner. The active material layer is formed so that part of the portion where the undercoat layer is formed is exposed and preferably formed so that a marginal portion of the portion where the undercoat layer is formed is exposed. An area of the active material layer is preferably 80 to 99% by area, and more preferably 90 to 95% by area of the portion where the undercoat layer is formed (the sum of an area of the undercoat layer literally formed and an area of the metal foil exposed in the undercoat layer formed in a patterned manner when the undercoat layer is formed in the patterned manner). When the active material layer is formed on both surfaces, a portion where the undercoat layer is formed and no active material layer is formed is preferably provided in the same position of the both surfaces. The shape of the portion where the undercoat layer is formed and no active material layer is formed is not specifically limited.

With an increase in a thickness of the active material layer, an electric capacity per electrode plate is increased, but an internal resistance of an electricity storage device is increased. Therefore, the thickness of the active material layer can be appropriately set so as to realize a desired battery capacity and the internal resistance with a predetermined value or less. The thickness of the active material layer is preferably 10 μm to 200 μm.

The active material layer usually comprises an active material and a binding agent, and a conductive assistant and an additive as needed. As any materials, a well-known material is employable according to the type of an electricity storage device.

In an active material layer used for the positive electrode of a lithium-ion secondary battery, as an active material, usable are, for example, lithium cobalate ($LiCoO_2$), lithiummanganate ($LiMn_2O_4$), lithium nickelate ($LiNiO_2$), ternary lithium compounds ($Li(Co_xMn_yNi_z)O_2$) of Co—Mn—Ni, sulfur based compound ($TiS_2$), olivine compounds ($LiFePO_4$, $LiMnPO_4$) and the like.

In an active material layer used for the negative electrode of a lithium-ion secondary battery, as an active material, usable are, for example, carbon materials such as artificial graphite, natural graphite and the like; metal materials or metalloide materials such as Sn, Si and the like; and lithium titanate and metal oxides such as titanium oxide and the like.

Charging of the lithium-ion secondary battery proceeds in such a manner that lithium ions having been held in a positive electrode active material are de-intercalated and released into an electrolytic solution, and the lithium ions in the electrolytic solution are intercalated between crystal layers of a carbon material that is a negative electrode active material. Further, on the contrary of charging, discharge proceeds in such a manner that lithium ions are released from the negative electrode active material, and intercalated in the positive electrode active material.

In an active material layer used for the electrode of an electric double layer capacitor, as an active material, for example, activated carbon is usable. As the activated carbon, coconut shell activated carbon, fibrous active carbon, and the like are mentioned. The activated carbon is not specifically limited by its activation method, and those obtained by a steam activation method, a chemical activation method, and the like are employable. To obtain a capacitor having large capacity, those subjected to an alkaline activation treatment, i.e., alkaline activated carbon is preferable.

The electric double layer capacitor is not an electricity storage system such as a lithium-ion secondary battery according to faradaic reaction. The electric double layer capacitor is an electricity storage system utilizing a physical phenomenon in which cations and anions each in an electrolytic solution form an electric double layer on the surface of the active material in the electrode.

In an active material layer used for the electrode of the lithium-ion secondary battery or the electric double layer capacitor, as a conductive assistant, usable are, for example, conductive carbon black such as acetylene black, Ketjen-black, furnace black, and the like; graphite such as artificial graphite, natural graphite, and the like; and carbon fiber, vapor-grown carbon fiber, carbon nanotube, carbon nanofiber, and the like.

In the active material layer used for the electrode of the lithium-ion secondary battery or the electric double layer capacitor, as a binding agent, usable are, for example, polyethylene, polypropylene, ethylene propylene copolymers, ethylene propylene terpolymers, butadiene rubber, styrene butadiene rubber, butyl rubber, polytetrafluoroethylene, poly(meth)acrylates, polyvinylidene fluoride, polyethylene oxide, polypropylene oxide, polyepichlorohydrin, polyphosphazene, polyacrylonitrile, and the like.

A method for forming an active material layer is not specifically limited, and a well-known method used for producing an electricity storage device is employable. When, for example, an active material layer is formed by a coating method, initially, an active material is uniformly dispersed in a liquid medium, together with a conductive assistant and a biding agent as needed, to obtain a coating liquid. The liquid medium is not specifically limited unless changing an undercoat layer in quality. As a liquid medium used for an active material layer coating liquid, the same ones as liquid medium usable for an undercoat layer coating liquid are mentioned. As a method for applying a coating liquid and a method for drying a coated coating liquid, a coating method and a drying method employable upon formation of an undercoat layer are employable as they are. After drying, press treatment is preferably performed. The press treatment can provide an active material layer having high density.

An electrode plate used in the present invention may comprise another member such as a heat-resistant layer in addition to the metal foil, the undercoat layer, and the active material layer. The heat-resistant layer is usually provided on the active material layer.

Figure 3:
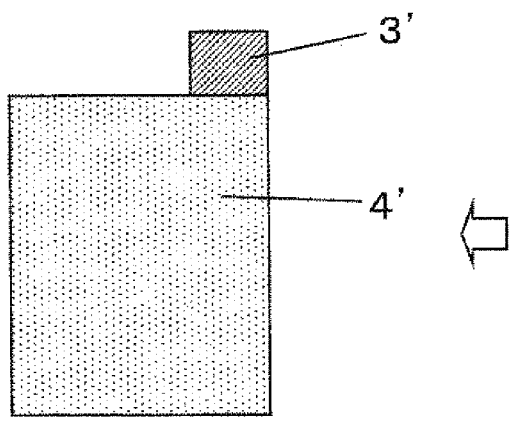
FIG. 3 a view illustrating an embodiment of an electrode plate used in the present invention.

The electrode plate is not specifically limited by its shape. For example, a rectangle shape as illustrated in FIG. 1 and a notched shape as illustrated in FIG. 3 are mentioned.

<Metal Tab Lead>

A metal tab lead is not specifically limited as long as it is used for an electricity storage device. The metal tab lead is preferably composed of a metal foil. The metal tab lead is preferably 0.05 to 1 mm in thickness, 5 to 150 mm in width, and 10 to 100 mm in length. A material used for the metal tab lead is not specifically limited, examples of the material include a metal such as nickel, aluminum, titanium, copper, and the like; and an alloy such as stainless steel, nickel alloy, aluminum alloy, titanium alloy, copper alloy, and the like. An aluminum foil used for the metal tab lead is preferably one subjected to a well-known annealing treatment. The annealing treatment is preferably performed in inactive or reductive atmosphere. Annealing temperature is preferably 100° C. to 500° C. Annealing time varies depending on the annealing temperature, but is preferably about 1 minute to 1 hour.

As a copper foil used for the metal tab lead, a rolled copper foil, an electrolytic copper foil, and the like are mentioned. Of these, a rolled oxygen-free copper foil is preferable from the viewpoint of easiness in welding and high durability of a welded portion. Further, as the copper foil, those subjected to anticorrosion treatment such as chromate treatment or nickel plating treatment are preferably used.

The metal tab lead may be composed of a laminate foil provided with a metal coat on its metal foil surface. As the metal coat formed on the metal foil surface, a coat mainly containing nickel is selected. The nickel coated layer is preferably set to have a thickness of 1 to 5 µm.

An insulating film is preferably bonded to part of the surface of the metal tab lead. As the insulating film, those formed from an olefin-based polymer are preferable. When an electrode is enclosed in a packaging material and sealed using a heat seal, an insulating film bonded to the metal tab lead surface and a packaging material sealant portion are allowed to adhere to each other air-tightly and then insulating properties between the metal tab lead and the packaging material can be ensured.

[Electrode]

An electrode used in the present invention comprises a metal tab lead and at least two electrode plates. The electrode plates constituting the electrode used in the present invention are welded to each other in a portion where an undercoat layer is formed and no active material layer is formed, and at least one of the electrode plates is welded to the metal tab lead in a portion where the undercoat layer is formed and no active material layer is formed. A portion where an undercoat layer is formed and no active material layer is formed (comprising not only a portion of an exposed undercoat layer but also a metal foil exposed in the undercoat layer formed in a pattern manner when the undercoat layer is formed in the patterned manner) will be referred to as a tab lead welding portion in some cases.

A plurality of electrode plates is preferably stacked so that tab lead welding portions are disposed in the same position.

In the plural electrode plates, it is preferable that the electrode plates have substantially the same shape and the tab lead welding portions have substantially the same shape. Further, in plural electrode plates having an undercoat layer and an active material layer formed on both surfaces of a metal foil, the pattern shapes of the undercoat layers on the respective surfaces are preferably substantially the same and the pattern shapes of exposed portions of the undercoat layers on the respective surfaces are preferably substantially the same. Such a configuration makes it possible that when the tab lead welding portions of the electrode plates are stacked so as to be disposed in the same position, the edges of the electrode plates are matched and then a volume of an electricity storage device is reduced.

A total thickness of metal foils in a plurality of electrode plates is preferably 0.2 to 2 mm, more preferably 0.3 to 1.5 mm, and still more preferably 0.5 to 1.5 mm. When the total thickness of the metal foils is increased, an electricity storage device having large capacity tends to be easily obtained. On the other hand, when the total thickness of the metal foils is decreased, a bending stress applied to the tab lead welding portions tends to easily fall within an allowable range when plural electrode plates are brought together to be welded to a metal tab lead. Plural electrode plates are stacked, for example, by preparing preferably 10 to 100 metal foils when having a thickness of 20 μm or preferably 4 to 40 metal foils when having a thickness of 50 μm.

It is preferable to alternately stack, one by one, one group of plural electrode plates to form one electrode and the other group of plural electrode plates to form the other electrode. Further, a separator is preferably sandwiched between an electrode plate for forming one electrode and an electrode plate for forming the other electrode.

Further, with respect to an electrode plate and a metal tab lead, a tab lead welding portion of the electrode plate is stacked with the metal tab lead. The metal tab lead may be stacked onto a tab lead welding portion of the outermost electrode plate of plural electrode plates or may be stacked so as to sandwich the metal tab lead between the tab lead welding portions of two optional electrode plates adjacent to each other of the plural electrode plates.

Figure 4:
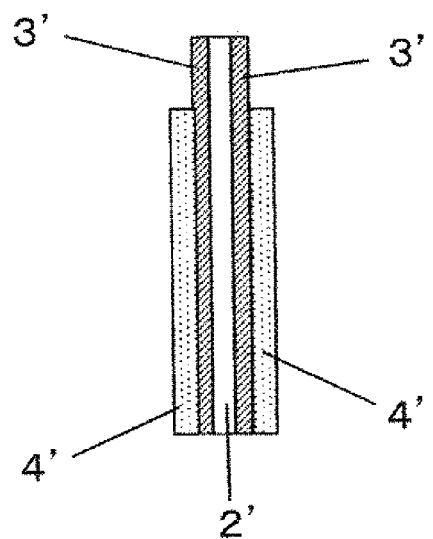
FIG. 4 a view illustrating a side surface when the electrode plate is viewed from the arrow direction illustrated in FIG. 3.
Figure 5:
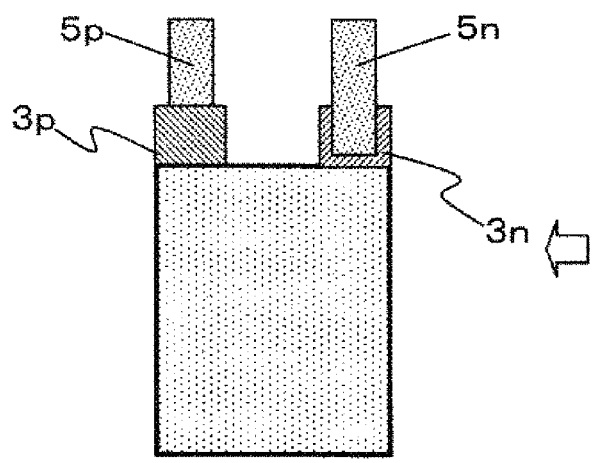
FIG. 5 a view illustrating an embodiment in which electrode plates P and electrode plates N are stacked.
Figure 6:
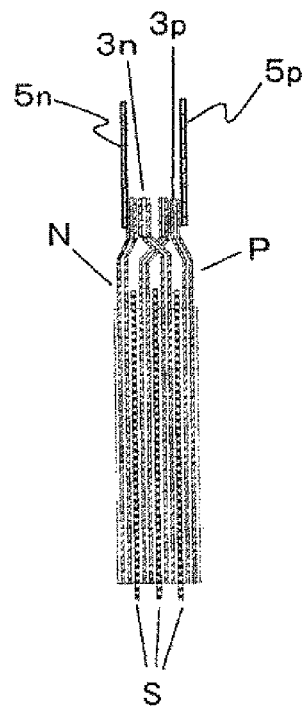
FIG. 6 a view illustrating a side surface when the electrode plates are viewed from the arrow direction illustrated in FIG. 5.
Figure 7:
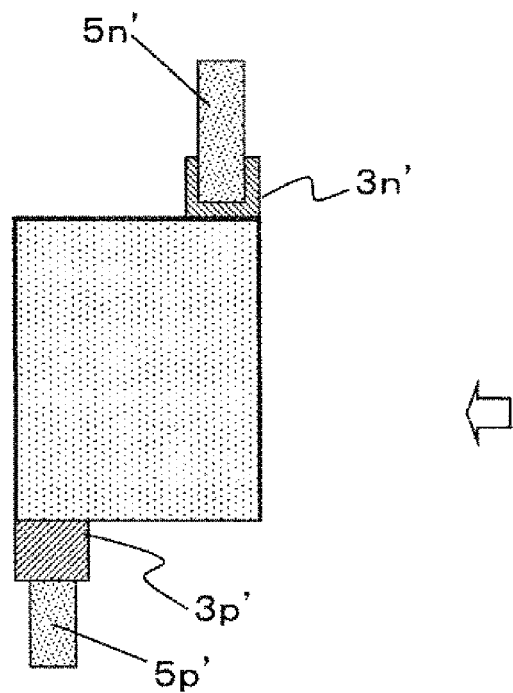
FIG. 7 a view illustrating an embodiment in which electrode plates P' and electrode plates N' are stacked.
Figure 8:
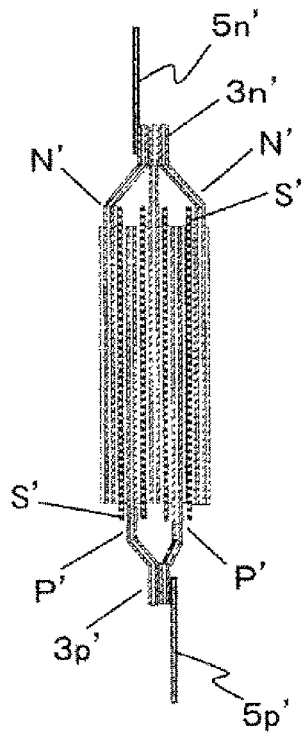
FIG. 8 a view illustrating a side surface when the electrode plates are viewed from the arrow direction illustrated in FIG. 7.

When, for example, an electrode plate has a shape as shown in FIG. 3 and FIG. 4, a plurality of electrode plates P and a plurality of electrode plates N are stacked as shown in FIG. 5 and FIG. 6, and thereby, a metal tab lead $5p$ can be welded to a tab lead welding portion $3p$ of the electrode plate P, and a metal tab lead $5n$ can be welded to a tab lead welding portion $3n$ of the electrode plate N. Further, a plurality of electrode plates P' and a plurality of electrode plates N' are stacked as shown in FIG. 7 and FIG. 8, and thereby, a metal tab lead $5p'$ can be welded to a tab lead welding portion $3p'$ of the electrode plate P', and a metal tab lead $5n'$ can be welded to a tab lead welding portion $3n'$ of the electrode plate N'.

As a welding method, a well-known method used for welding metals is selected. For example, TIG welding, spot welding, laser welding, ultrasonic welding, and the like are mentioned. Of these, ultrasonic welding is preferable from the viewpoint of welding strength.

Welding is performed according to the following steps. For example, stacked electrode plates are disposed between an anvil and a horn and a metal tab lead is disposed on tab lead welding portions, followed being applied with ultrasonic waves, which can realize one shot welding. The one shot welding does not refer to one-by-one welding of plural electrode plates and a tab lead but refers to collective welding thereof. Ultrasonic waves may be applied by being separated into plural times as long as collective treatment is carried out. Further, it is possible that electrode plates are initially welded to each other and then a metal tab lead is welded thereto. Changes in pressure, frequency, output, and treatment time during welding make it possible to change a degree of welding. Further, a change in the tip shape of the horn makes it possible to change a welding area. The shape of the tip of the horn can be, for example, needle-like, spherical and so on. Further, a shape obtained so as to have a large number of contact points by providing irregularities as seen in an embossing die is employable for the tip of the horn. The welding area refers to an area of a portion applied with ultrasonic waves by being brought into contact with a metal tab lead. The welding area can be appropriately set according to a shape and area of a tab lead welding portion. For example, the welding area can be set to be preferably 1 to 50%, and more preferably 2 to 40% of an area of one surface of the tab lead welding portion.

The electricity storage device according to the present invention can employ an electrode having a structure as described above as a positive electrode and a negative electrode or as any one of the positive electrode and the negative electrode. Further, the electricity storage device according to the present invention can employ an electrode having a structure as described above as one electrode and a well-known electrode as the other electrode.

(Separator)

To prevent short circuit, a separator S is disposed between a positive electrode plate and a negative electrode plate. As the separator, those formed of a porous insulating material such as non-woven cloth, woven cloth, porous film, and the like. Examples of the porous film include microporous film made of polyethylene or polypropylene. Further, the separator may comprise a heat-resistant layer comprising inorganic oxide particles.

A positive electrode and a negative electrode in which a separator is sandwiched therebetween as described above are housed in a packaging material such as a metal can, a laminated bag, and the like. Then, an electrolyte is placed therein and the electrolyte is impregnated into the positive electrode and the negative electrode with elimination of moisture. Lastly, the packaging material is vacuum-sealed and thereby, an electricity storage device can be obtained. When as the electrolyte, a gel or solid electrolyte is used, a separator may be omitted.

(Electrolyte)

As an electrolyte, employable are well-known materials used for an electricity storage device such as a lithium-ion secondary battery, an electric double layer capacitor, and the like.

As the electrolyte used for the lithium-ion secondary battery, for example, a non-aqueous electrolytic solution, a polymer electrolyte, an inorganic solid electrolyte, a molten salt electrolyte, and the like can be mentioned.

The non-aqueous electrolytic solution is a solution obtained by dissolving an electrolyte salt in a non-aqueous organic solvent. As the electrolyte salt, fluorine-containing lithium salts such as lithium hexafluorophosphate ($LiPF_6$), lithium tetrafluoroborate ($LiBF_4$), and the like can be mentioned. As the non-aqueous organic solvent, ethylene carbonate (EC), dimethyl carbonate (DMC), and the like can be mentioned.

As the polymer electrolyte, those obtained by incorporating the aforementioned electrolyte salt into a polymer containing a polyethylene oxide derivative and a derivative thereof, a polymer containing a polypropylene oxide derivative and a derivative thereof, a phosphate polymer, a polymer containing a polycarbonate derivative and a derivative thereof, or the like can be mentioned.

As the inorganic solid electrolyte, those containing sulfide glass as a main component are mentioned. Glass ceramics in which, for example, lithium sulfide and at least one selected from the group consisting of silicon sulfide, germanium sulfide, phosphorous sulfide and boron sulfide are combined can be used. Of these, glass ceramics in which lithium sulfide and phosphorous sulfide are combined is preferably used due to large ionic conductivity.

Examples of the molten salt electrolyte include those obtained by combining methylpropylimidazolium bis(fluorosulfonyl)amide and lithium bis(trifluoromethane)sulfonamide.

Examples of the electrolyte used for the electric double layer capacitor include a water-soluble electrolytic solution and a non-aqueous electrolytic solution. As the water-soluble electrolytic solution, a sulfuric acid aqueous solution, a sodium sulfate aqueous solution, a sodium hydoxide aqueous solution, and the like are mentioned. Further, the non-aqueous electrolytic solution refers to a solution obtained by dissolving a cationic electrolyte or an anionic electrolyte in a non-aqueous solvent. As the cationic electrolyte, a tetraethylammonium salt and the like are mentioned. As the anionic electrolyte, tetrafluoroborate ion ($BF_4^-$), bis(trifluoromethylsulfonyl)imide (($CF_3SO_2)_2N^-$), and the like are mentioned. As the non-aqueous solvent, ethylene carbonate (EC), dimethyl carbonate (DMC), and the like are mentioned.

(Packaging Material)

As a packaging material, a well-known packaging material used for an electricity storage device is selectable, and a laminated packaging material is preferable. A configuration of the laminated packaging material is not specifically limited, and those having a polymer layer on both sides of an aluminum foil are mentioned. For a polymer layer serving as the exterior of the electricity storage device, for example, a polyamide, those obtained by laminating a polyester on a polyamide, and the like are used from the viewpoint of heat resistance, sticking strength, lubricating properties, printability, and others. As a polymer layer of the interior, a thermoplastic polyolefin and the like serving as a heat sealant are used.

EXAMPLES

More specifically, the present invention will be described with reference to examples and comparative examples. The scope of the present invention is not limited by the present examples. Appropriate modifications can be made without modifying the gist of the present invention to carry out the present invention.

Example 1

<Preparation of Undercoat Layer Coating Liquid>

There were mixed 10 parts by mass of acetylene black (trade name: DENKA BLACK (HS-100), produced by Denki Kagaku Kogyo K.K.), 5 parts by mass of dihydroxypropylchitosan (deacetylation degree: 86 mol %, weight average molecular weight: $9.0 \times 10^4$), 5 parts by mass of pyromellitic dianhydride, and N-Methyl-2-pyrrolidone (industrial grade), followed by being mixed therewith using a dissolver type stirrer at a rotation rate of 300 rpm for 10 minutes. Subsequently, using a homogenizer (product name: PRO200, produced by Ieda Trading Corp.), homogenization was carried out at 20000 rpm for 30 seconds to obtain an undercoat layer coating liquid having a solid content concentration of 7% by mass.

<Formation of Undercoat Layer>

The undercoat layer coating liquid was applied entirely on one surface of an aluminum foil (A1N30 material) having a thickness of 20 μm using a bar coating method. Thereafter, heat treatment was carried out for 3 minutes at 180° C. for drying. Then, on the other surface, the undercoat layer coating liquid was applied in the same manner to obtain an aluminum foil having an undercoat layer formed on the both surfaces (hereinafter, occasionally referred to as an Al current collection member). A coating weight per unit area of one surface of the undercoat layer was 0.5 g/m². In measurement of the coating weight per unit area of one surface, a small thin piece having a size of 100 mm×100 mm was accurately cut out from the Al current collection member and one surface of the small thin piece was treated with a remover (trade name: NEOREVER#346, produced by Sansai Kako Co., Ltd.) and the undercoat layer was removed from the one surface of the small thin piece for calculation based on a mass difference before and after the removal.

<Production of Positive Electrode Plate>

A small thin piece (hereinafter, occasionally referred to as an Al current collector) having a size of 100 mm×100 mm was cut out from the Al current collection member.

There were mixed 95 parts by mass of lithium cobalate (trade name: CELLSEED C, produced by Nippon Chemical Industries Co., Ltd.), 2 parts by mass of acetylene black (trade name: DENKA BLACK (powdery article), produced by Denki Kagaku Kogyo K.K.), 3 parts by mass of polyvinylidene fluoride (trade name: KF POLYMER#1120, produced by Kureha Corp.), and 95 parts by mass of N-methyl-2-pyrrolidone (industrial grade) to obtain a slurry.

The slurry was applied on both surfaces of the Al current collector using a doctor blade method with the exception of a marginal portion of 100 mm long×10 mm wide on one side edge of the Al current collector. Thereafter, drying was carried out, followed by pressing to form a positive electrode active material layer of 90 mm wide×100 mm long×50 μm thick on each of the both surfaces of the Al current collector. The resulting product was used as a positive electrode plate P″. The marginal portion of 10 mm wide×100 mm long where the undercoat layer was exposed and no positive electrode active material layer was formed was used as a tab lead welding portion 3P″.

<Production of Negative Electrode Plate>

There were mixed 94 parts by mass of artificial graphite (trade name: SCMG-AR, produced by Showa Denko K.K.), 1 part by mass of acetylene black (trade name: DENKA BLACK (powdery article), produced by Denki Kagaku Kogyo K.K.), 5 parts by mass of polyvinylidene fluoride (trade name: KF POLYMER#9130, produced by Kureha Corp.), and 94 parts by mass of N-methyl-2-pyrrolidone (industrial grade) to obtain a slurry.

An electrolyte copper foil of 100 mm wide×100 mm long×10 μm thick was prepared.

The slurry was applied on both surfaces of the electrolyte copper foil using a doctor blade method with the exception of a marginal portion of 10 mm wide×100 mm long on one side of the electrolyte copper foil. Thereafter, drying was carried out, followed by pressing to form a negative electrode active material layer of 90 mm wide×100 mm long×55 μm thick on each of the both surfaces of the electrolyte copper foil. The resulting product was used as a negative electrode plate N″. The marginal portion of 10 mm wide× 100 mm long where the copper foil was exposed and no negative electrode active material layer was formed was used as a tab lead welding portion 3n″.

Figure 9:
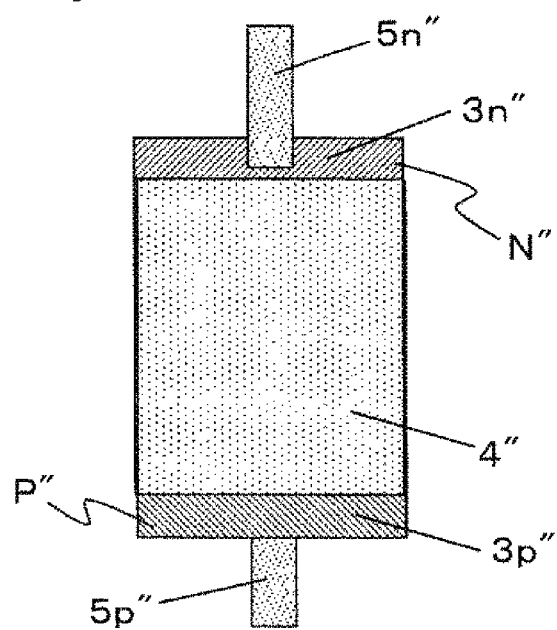
FIG. 9 a view illustrating an embodiment in which electrode plates P" and electrode plates N" are stacked.

As shown in FIG. 9, 15 positive electrode plates and 16 negative electrode plates were alternately stacked one by one so that the tab lead welding portions 3p″ and 3n″ were pulled out in opposite directions, and a separator (trade name: Celgard 2500, produced by Polypore International, Inc.) was inserted between the positive electrode plate and the negative electrode plate to obtain an electrode plate laminate in which the outermost layers of the laminate were the negative electrode plate, respectively.

Then, a positive electrode tab lead (made of A1N30-H (aluminum), a size of 0.5 mm thick×20 mm wide×30 mm long) 5P" was prepared. One positive electrode tab lead 5P" and 15 tab lead welding portions 3p" of the positive electrode plates in the electrode plate laminate were welded using an ultrasonic welder. The welding was carried out under conditions involving a horn tip angle of 90 degrees, a pressure of 0.3 MPa, a frequency of 20 kHz, and a duration of 0.3 seconds. The tip of the horn had a rectangular shape of 2 mm×12 mm, and welding area was 24 mm$^2$.

A negative electrode tab lead (made of oxygen-free copper, a size of 0.2 mm thick×20 mm wide×30 mm long, coated nickel: 1 μm) 5n" was prepared. One negative electrode tab lead 5n" and 16 tab lead welding portions 3n" of the positive electrode plates in the electrode plate laminate were welded using an ultrasonic welder. The welding was carried out under conditions involving a horn tip angle of 90 degrees, a pressure of 0.3 MPa, a frequency of 20 kHz, and a duration of 0.3 seconds. The tip of the horn had a rectangular shape of 2 mm×12 mm, and welding area was 24 mm$^2$.

The electrode plate laminate was covered with an aluminum laminated packaging material with the positive electrode tab and the negative electrode tab each protruded, and three sides were sealed to form a bag-like shape having one side open. Water was eliminated using a vacuum dryer set at 60° C. Thereafter, as an organic electrolytic solution, a LiPF$_6$ solution (produced by Kishida Chemical Co., Ltd.) was poured in, followed by impregnation for 24 hours in vacuum atmosphere. The opening of the aluminum laminated packaging material was sealed using a vacuum sealer to produce a lithium-ion secondary battery for evaluation tests.

<Evaluation Tests of Lithium-Ion Secondary Battery>
(Measurement of Tab Lead Welding Strength)

The measurement was carried out using a tabletop material testing machine (STA-1150, produced by Orientech Co., Ltd.) in a tensile test mode. The positive electrode tab lead and the battery body part of the lithium-ion secondary battery for evaluation tests each were nipped by chucks to be fixed, followed by being pulled in opposite directions at a rate of 5 mm/min, and a maximum load until fracture was measured to be designated as welding strength. A distance between the chucks was 50 mm and the tab lead welding portions were set so as to be disposed in the middle between the chucks. A larger numerical value indicates a higher welding strength. The result is shown in Table 1.

(Measurement of Internal Resistance)

An internal resistance of the lithium-ion secondary battery for evaluation tests was measured at a measurement frequency of 1 kHz by an AC impedance method using an impedance meter (model 3532-80, produced by Hioki E.E. Corp.). A value under the condition of an SOC (charge state) of 100% was designated as an internal resistance value. An internal resistance value after battery production is expressed as "Initial Value" and the result is shown in Table 1.

(Cycle Test)

Using a charge and discharge device (produced by Toyo System Co., Ltd.), the lithium-ion secondary battery for evaluation tests was charged and discharged for 200 cycles at a current rate of 10 C. Thereafter, internal resistance was measured. The measurement was made at a cut voltage of 2.7 to 4.2 V with an SOC of 100%. An internal resistance value after 200-cycle charge and discharge is expressed as "After 200 Cycles" and the result is shown in Table 1.

Example 2

A lithium-ion secondary battery was produced in the same manner as in Example 1 except that the number of positive electrode plates was changed to 30 and the number of negative electrode palates was changed to 31, and then evaluated. The results are shown in Table 1.

Example 3

A lithium-ion secondary battery was produced in the same manner as in Example 1 except that the number of positive electrode plates was changed to 50 and the number of negative electrode palates was changed to 51, and then evaluated. The results are shown in Table 1.

Example 4

A lithium-ion secondary battery was produced in the same manner as in Example 1 except that the number of positive electrode plates was changed to 80 and the number of negative electrode palates was changed to 81, and then evaluated. The results are shown in Table 1.

Example 5

A lithium-ion secondary battery was produced in the same manner as in Example 1 except that an aluminum foil having the thickness of 30 μm was employed instead of the aluminum foil having the thickness of 20 μm, and then evaluated. The results are shown in Table 1.

Example 6

A lithium-ion secondary battery was produced in the same manner as in Example 1 except that an aluminum foil having the thickness of 50 μm was employed instead of the aluminum foil having the thickness of 20 μm, and then evaluated. The results are shown in Table 1.

Example 7

A lithium-ion secondary battery was produced in the same manner as in Example 1 except that a solid content concentration of the undercoat layer coating liquid was adjusted and a coating weight per unit area of one surface was changed to 1.2 g/m$^2$, and then evaluated. The results are shown in Table 1.

Example 8

A lithium-ion secondary battery was produced in the same manner as in Example 1 except that a solid content concentration of the undercoat layer coating liquid was adjusted and a coating weight per unit area of one surface was changed to 2.7 g/m$^2$, and then evaluated. The results are shown in Table 1.

Example 9

A lithium-ion secondary battery was produced in the same manner as in Example 2 except that in production of the positive electrode plate, instead of the Al current collector, an aluminum foil (A1N30 material) having a thickness of 20

μm was used and in production of the negative electrode plate, instead of the electrolyte copper foil, a Cu current collector obtained by a method to be described below was used, and then evaluated. The results are shown in Table 1.

Tab lead welding strength was measured in the same manner as in Example 2 except that instead of a portion welded with the positive electrode tab lead, a portion welded with the negative electrode tab lead was measured.

<Production of Cu Current Collector>

The undercoat layer coating liquid prepared in Example 1 was applied entirely on one surface of an electrolyte copper foil having a thickness of 10 μm using a bar coating method. Thereafter, heat treatment was carried out for 3 minutes at 180° C. for drying. Then, The undercoat layer coating liquid prepared in Example 1 was applied entirely on the the other surface in the same manner to obtain a copper foil comprising an undercoat layer formed on the both surfaces (hereinafter, occasionally referred to as a Cu current collection member). A coating weight per unit area of one surface of the undercoat layer was 0.5 g/m². In measurement of the coating weight per unit area of one surface, a small thin piece having a size of 100 mm×100 mm was accurately cut out from the Cu current collection member and one surface of the small thin piece was treated with a remover (trade name: NEOREVER#346, produced by Sansai Kako Co., Ltd.) and the undercoat layer was removed from the one surface of the small thin piece for calculation based on a mass difference before and after the removal. A small thin piece having a size of 100 mm×100 mm was cut out from the Cu current collection member. The small thin piece was used as a Cu current collector.

Example 10

A lithium-ion secondary battery was produced in the same manner as in Example 1 except that in preparation of the undercoat layer coating liquid, acetylene black was changed to graphite (trade name; C-NERGY KS6L, produced by Timcal Ltd.), and then evaluated. The results are shown in Table 1.

Example 11

A lithium-ion secondary battery was produced in the same manner as in Example 1 except that in preparation of the undercoat layer coating liquid, acetylene black was changed to carbon nanotube (trade name: VGCF-H, produced by Showa Denko K.K.), and then evaluated. The results are shown in Table 1.

Comparative Example 1

A lithium-ion secondary battery was produced in the same manner as in Example 1 except that a solid content concentration of the undercoat layer coating liquid was adjusted and a coating weight per unit area of surface was changed to 4.8 g/m², and then evaluated. The results are shown in Table 1.

Comparative Example 2

A lithium-ion secondary battery was produced in the same manner as in Example 1 except that a solid content concentration of the undercoat layer coating liquid was adjusted and a coating weight per unit area of surface was changed to 8.9 g/m², and then evaluated. The results are shown in Table 1.

Comparative Example 3

A lithium-ion secondary battery was produced in the same manner as in Example 1 except that in production of the positive electrode plate, instead of the Al current collector, an aluminum foil (A1N30 material) having a thickness of 20 μm was used, and then evaluated. The results are shown in Table 1.

TABLE 1

| | | Tab Lead Welding Portion | | | | | | Internal resistance (mΩ) | |
|---|---|---|---|---|---|---|---|---|---|
| | | Metal | Coating weight per unit area of | | Metal Foil | | | | |
| | Electrode Plate | Metal Foil Material | Foil Thickness (μm) | one surface (g/m²) | Number of Electrode Plates | Total Thickness (mm) | Welding Strength (N) | Initial Value | After 200 Cycles |
| Ex. 1 | Positive | Al | 20 | 0.5 | 15 | 0.3 | 121 | 1.7 | 1.7 |
| Ex. 2 | Positive | Al | 20 | 0.5 | 30 | 0.6 | 125 | 0.8 | 0.9 |
| Ex. 3 | Positive | Al | 20 | 0.5 | 50 | 1.0 | 108 | 0.5 | 0.5 |
| Ex. 4 | Positive | Al | 20 | 0.5 | 80 | 1.6 | 82 | 0.3 | 0.5 |
| Ex. 5 | Positive | Al | 30 | 0.5 | 15 | 0.45 | 101 | 1.8 | 2.0 |
| Ex. 6 | Positive | Al | 50 | 0.5 | 15 | 0.74 | 82 | 1.8 | 2.1 |
| Ex. 7 | Positive | Al | 20 | 1.2 | 15 | 0.3 | 111 | 1.7 | 2.1 |
| Ex. 8 | Positive | Al | 20 | 2.7 | 15 | 0.4 | 102 | 1.9 | 2.2 |
| Ex. 9 | Positive | Cu | 10 | 0.5 | 31 | 0.31 | 122 | 0.9 | 0.9 |
| Ex. 10 | Positive | Al | 20 | 0.5 | 15 | 0.3 | 97 | 1.7 | 1.8 |
| Ex. 11 | Positive | Al | 20 | 0.5 | 15 | 0.3 | 105 | 1.6 | 1.7 |
| Comp. Ex. 1 | Positive | Al | 20 | 4.8 | 15 | 0.3 | 66 | 2.2 | 3.8 |
| Comp. Ex. 2 | Positive | Al | 20 | 8.9 | 15 | 0.3 | 54 | 5.0 | 9.9 |
| Comp. Ex. 3 | Positive | Al | 20 | 0 | 15 | 0.3 | 238 | 3.6 | 7.7 |

Example 12

<Production of Electric Double Layer Capacitor>

There were mixed 100 parts by mass of activated carbon (trade name: YP-50F, produced by Kuraray Chemical Co., Ltd.), 5 parts by mass of acetylene black (trade name: DENKA BLACK (powdery article), produced by Denki Kagaku Kogyo K.K.), 7.5 parts by mass of styrene butadiene rubber (trade name: NALSTAR SR-103, produced by Nippon A&L Inc.), 2 parts by mass of carboxymethyl cellulose (trade name: CMC DN-10L, produced by Daicel FineChem Ltd.), and 200 parts by mass of pure water to obtain a paste. The paste was applied on both surfaces of the Al current collector using a doctor blade method with the exception of a marginal portion of 10 mm wide×100 mm long at one side of the Al current collector. Thereafter, drying was carried out, followed by pressing to form an electrode layer of 90 mm wide×100 mm long×80 μm thick on each of the both surfaces of the Al current collector. The resulting product was used as an electrode plate for an electric double layer capacitor. A marginal portion of 10 mm wide×100 mm long where the undercoat layer was exposed and no electrode layer was formed was used as a tab lead welding portion.

Thirty-one electrode plates were prepared, and of these, 15 plates were used for a positive electrode and 16 plates were used for a negative electrode. As illustrated in FIG. 9, these were alternately stacked one by one, and a separator (trade name: TF40, produced by Nippon Kodoshi Corp.) was inserted between the positive electrode plate and the negative electrode plate to obtain an electrode plate laminate in which the outermost layers of the laminate were the negative electrode plate respectively.

Subsequently, two aluminum-made tab lead (made of A1N30-H, a size of 0.5 mm thick×20 mm wide×30 mm long) were prepared. One of the aluminum-made tab leads (positive electrode tab lead) was welded to 15 tab lead welding portions of the positive electrode plates in the electrode plate laminate using an ultrasonic welder. The welding was carried out under conditions involving a horn tip angle of 90 degrees, a pressure of 0.3 MPa, a frequency of 20 kHz, and a duration of 0.3 seconds. The tip of the horn had a rectangular shape of 2 mm×12 mm, and welding area was 24 mm$^2$.

The other aluminum-made tab lead (negative electrode tab lead) was welded to 16 tab lead welding portions of the negative electrode plates in the electrode plate laminate using an ultrasonic welder. The welding was carried out under conditions involving a horn tip angle of 90 degrees, a pressure of 0.3 MPa, a frequency of 20 kHz, and a duration of 0.3 seconds. The tip of the horn had a rectangular shape of 2 mm×12 mm, and welding area was 24 mm$^2$.

The thus-obtained electrode plate laminate was covered with an aluminum laminated packaging material with the positive electrode tab lead and the negative electrode tab lead each protruded, and three sides were sealed to form a bag-like shape having one side open. Moisture was eliminated using a vacuum dryer set at 60° C. Thereafter, an organic electrolyte solution (trade name: LIPASTE-P/EAFIN (1 mole/1), produced by Toyama Pure Chemical Industries, Ltd.) was poured in, followed by impregnation for 24 hours in vacuum atmosphere. The opening of the aluminum laminated packaging material was sealed using a vacuum sealer to produce an electric double layer capacitor for evaluation tests.

<Evaluation of Electric Double Layer Capacitor>
(Measurement of Welding Strength)

The measurement was carried out using a tabletop material testing machine (STA-1150, produced by Orientech Co., Ltd.) in a tensile test mode. The positive electrode tab lead and the capacitor body part of the electric double layer capacitor for evaluation tests each were nipped by chucks to be fixed, followed by being pulled in opposite directions at a rate of 5 mm/min, and a maximum load until fracture was measured to be designated as welding strength. A distance between the chucks was set to be 50 mm and the tab lead welding portions were set so as to be disposed in the middle between the chucks. A larger numerical value indicates a higher welding strength. The result is shown in Table 2.

(Measurement of Internal Resistance)

An internal resistance of the electric double layer capacitor for evaluation tests was measured at a measurement frequency of 1 kHz by an AC impedance method using an impedance meter (model 3532-80, produced by Hioki E.E. Corp.). A value under the condition of an SOC (charge state) of 100% was designated as an internal resistance value. An internal resistance value after capacitor production is expressed as "Initial Value" and the result is shown in Table 2.

(Cycle Test)

Using a charge and discharge device (produced by Toyo System Co., Ltd.), the electric double layer capacitor for evaluation tests was charged and discharged for 500 cycles between 0 V and 2.5 V at a current density of 1.59 mA/cm$^2$. Thereafter, internal resistance was measured. An internal resistance value after 500-cycle charge and discharge is expressed as "After 500 Cycles" and the result is shown in Table 2.

Example 13

An electric double layer capacitor was produced in the same manner as in Example 12 except that a solid content concentration of the undercoat layer coating liquid was adjusted and a coating weight per unit area of surface was changed to 1.2 g/m$^2$, and then evaluated. The results are shown in Table 2.

Example 14

An electric double layer capacitor was produced in the same manner as in Example 12 except that a solid content concentration of the undercoat layer coating liquid was adjusted and a coating weight per unit area of surface was changed to 2.7 g/m$^2$, and then evaluated. The results are shown in Table 2.

Comparative Example 4

An electric double layer capacitor was produced in the same manner as in Example 12 except that a solid content concentration of the undercoat layer coating liquid was adjusted and a coating weight per unit area of surface was changed to 4.8 g/m$^2$, and then evaluated. The results are shown in Table 2.

Comparative Example 5

An electric double layer capacitor was produced in the same manner as in Example 12 except that a solid content concentration of the undercoat layer coating liquid was adjusted and a coating weight per unit area of surface was changed to 8.9 g/m$^2$, and then evaluated. The results are shown in Table 2.

TABLE 2

| | | | Tab Lead Welding Portion | | | | | Internal resistance (mΩ) | |
|---|---|---|---|---|---|---|---|---|---|
| | Electrode Plate | Metal Foil Material | Metal Foil Thickness (μm) | Coating weight per unit area of one surface (g/m²) | Number of Electrode Plates | Metal Foil Total Thickness (μm) | Welding Strength (N) | Initial Value | After 500 Cycles |
| Ex. 12 | Positive | Al | 20 | 0.5 | 15 | 300 | 119 | 2.7 | 3.0 |
| Ex. 13 | Positive | Al | 20 | 1.2 | 15 | 300 | 110 | 2.8 | 3.0 |
| Ex. 14 | Positive | Al | 20 | 2.7 | 15 | 300 | 103 | 3.0 | 3.3 |
| Comp. Ex. 4 | Positive | Al | 20 | 4.8 | 15 | 300 | 69 | 3.6 | 9.8 |
| Comp. Ex. 5 | Positive | Al | 30 | 8.9 | 15 | 300 | 53 | 5.5 | 15.5 |

EXPLANATION OF REFERENCE SIGNS 1, 1': electrode plate
2, 2': metal foil
3, 3': undercoat layer
4, 4', 4": active material layer
5n, 5n', 5n": negative electrode tab lead
3n, 3n', 3n": tab lead welding portion of negative electrode
5p, 5p', 5p": positive electrode tab lead
3p, 3p', 3p": tab lead welding portion of positive electrode
S, S': separator
N, N', N": Negative electrode
P, P', P": Positive electrode

The invention claimed is:

1. An electricity storage device comprising at least one electrode comprising a metal tab lead and at least two electrode plates, in which
   each of the at least two electrode plates comprises a metal foil, an undercoat layer and an active material layer, in which the undercoat layer is formed on one surface or both surfaces of the metal foil, and the active material layer is formed on a surface in a part of a portion where the undercoat layer is formed,
   the undercoat layer comprises a carbon material and the under coat layer has a coating weight per unit area of one surface of 0.05 to 3 g/m²,
   the electrode plates are welded to each other in a portion where the undercoat layer is formed and no active material layer is formed,
   at least one of the electrode plates is welded to the metal tab lead in a portion where the undercoat layer is formed and no active material layer is formed.

2. The electricity storage device according to claim 1, wherein a sum total thickness of the metal foils in the electrode plates is 0.2 to 2 mm.

3. The electricity storage device according to claim 1, wherein the undercoat layer comprises 1 to 60% by mass of the carbon material.

4. The electricity storage device according to claim 1, wherein the undercoat layer comprises 20 to 300 parts by mass of a binding agent based on 100 parts by mass of the carbon material.

5. The electricity storage device according to claim 4, wherein the binding agent is chitosan or a derivative thereof.

6. The electricity storage device according to claim 1, wherein an area of the active material layer is 80 to 99% by area of an area of the portion where the undercoat layer is formed.

7. The electricity storage device according to claim 1, wherein the metal tab lead comprises at least one selected from the group consisting of aluminum, copper, and nickel.

8. The electricity storage device according to claim 1, wherein the metal foil is an aluminum foil or a copper foil.

9. The electricity storage device according to claim 1, wherein the each metal foil has a thickness of 5 to 70 μm.

10. The electricity storage device according to claim 1, wherein the carbon material comprises at least one selected from the group consisting of graphite, conductive carbon black, carbon nanotube, and carbon nanofiber.

11. The electricity storage device according to claim 1 is a lithium-ion battery.

12. A method for producing the electricity storage device according to claim 1, the method comprising the steps of:
   preparing the electrode plates, in which each of the electrode plates comprises the metal foil, the undercoat layer formed on one surface or both surfaces of the metal foil, and the active material layer formed on the surface in a part of the portion where the undercoat layer is formed; and
   welding the electrode plates to each other in the portion where the undercoat layer is formed and no active material layer is formed and
   welding at least one of the electrode plates to the metal tab lead in the portion where the undercoat layer is formed and no active material layer is formed.

13. The production method according to claim 12, wherein the welding steps are performed by one shot welding.

14. The production method according to claim 12, wherein the welding steps are performed by ultrasonic welding.

* * * * *